UNITED STATES PATENT OFFICE.

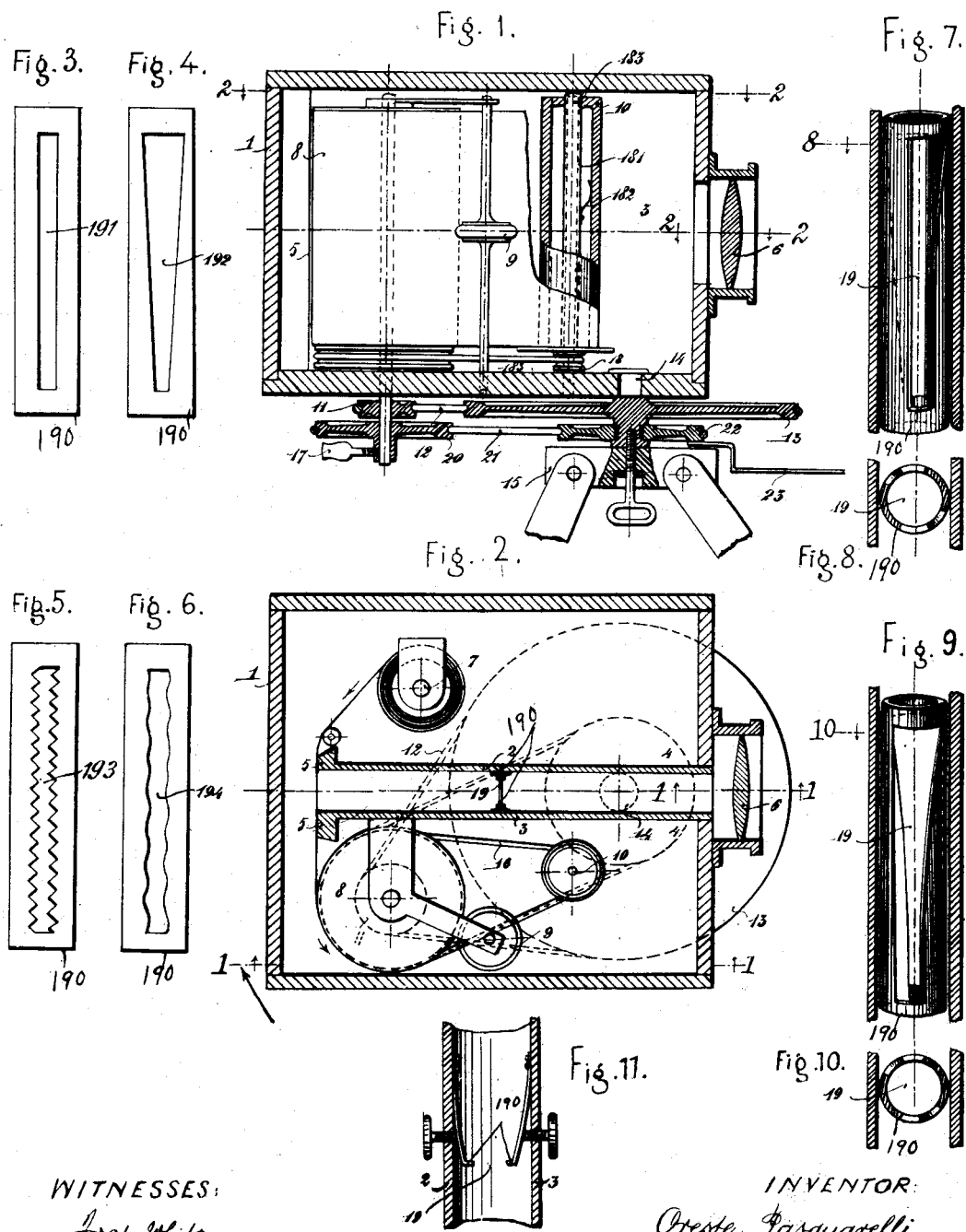

ORESTE PASQUARELLI, OF TURIN, ITALY, ASSIGNOR TO A. LUINO & CO., OF SAME PLACE.

MEANS FOR PHOTOGRAPHING PANORAMIC VIEWS.

SPECIFICATION forming part of Letters Patent No. 683,573, dated October 1, 1901.

Application filed September 11, 1900. Serial No. 29,659. (No model.)

*To all whom it may concern:*

Be it known that I, ORESTE PASQUARELLI, a subject of the King of Italy, residing at Turin, Italy, have invented certain new and useful Improvements in Means for Photographing Panoramic Views, of which the following is a specification.

This invention relates to means for photographing panoramic views.

In the preferred form of my invention I provide a camera which is mounted to turn upon a fixed axis and provide means whereby the film is moved past the exposure position at a rate of speed which is in fixed proportion to the speed of rotation of the camera.

My invention also provides a means whereby the movements of the film and camera are accomplished in a positive manner at proper relative speeds, preferably by causing the movements of the camera to effect the movements of the film, and provides other important improvements, which will be hereinafter referred to.

I have illustrated the form of apparatus I prefer to employ in the accompanying drawings, in which—

Figure 1 is a vertical section on the line 1 1 in Fig. 2, and Fig. 2 is a horizontal section on the line 2 2 in Fig. 1. Figs. 3, 4, 5, 6, 7, 8, 9, 10, and 11 refer to details of construction of the camera.

Referring to the drawings, let 1 indicate the camera, which, as shown, is divided by the partitions 2 and 3 into a middle or exposing chamber and two side chambers, the partitions being joined to the wall of the camera at their front ends 4 and at their rear ends 5 extending to within a certain distance from the rear wall of the camera. At their rear ends the partitions 2 and 3 form a window or space 5 5, past which the film travels and at which point it is exposed. The side chambers may be omitted, if desired, their purpose being to contain the exposed and unexposed portions of the film and suitable rollers for holding the film, and any other construction may be adopted which permits the movement of the unexposed film past the exposure position. When used, the side chambers are dark, the rays of light passing only into the center chamber. A suitable objective 6 may be mounted in front of this chamber, as shown. The unexposed portion of the film is shown as rolled upon a vertical roller 7 and is drawn past the window or space 5 5 over a roller 8, against which it is pressed by an elastic disk 9, and finally passes around a roller 10. Any other means for mounting the film may be used, that shown being preferred because of its convenience and simplicity. The desired movement is given to the film in the present construction through the medium of the roller 8, which is rotated to draw the film past the exposure position at the appropriate rate of speed. I prefer that this movement shall not only correspond to the movement of the camera, but that the movement of the latter shall positively and accurately move the film at the proper rate of speed and shall automatically govern such speed, so that no matter what movement is given to the camera the film shall respond to such movement. In the construction shown the shaft of the roller 8 is carried beneath the camera and has fixed to it a pulley 11, around which is passed a cord or belt 12. To the top of the tripod 15 or other stationary member is fixed a guide 13, preferably a wheel, as shown, which remains stationary, while the camera is adapted to bodily swing about a vertical shaft 14, which is concentric with the wheel 13. The belt 12 passes around the wheel 13 and frictionally engages its periphery, so that when the camera is moved about its pin 14 the roller 8 is rotated through the medium of its pulley 11 with a speed which is in fixed proportion to the speed of rotation of the camera. It is of course obvious that any other means may be employed to effect such rotation of the roller 8 or the consequent movement of the film. Any means employed for this purpose should operate so that the film travels past the exposure position at substantially the same speed and in the same direction as the view when the camera is in rotation. This is accomplished in the present construction by the proper proportioning of the pulleys 11 and 13 and roller 8. For the purpose of facilitating the winding of the exposed film the roller 10 may be provided with a suitable spring, or it may be connected with the roller 8 by a belt, as shown, or other suitable means may be employed for this purpose. To prevent excessive stretching of the film, it is advisable in the form of apparatus shown to make the engagement of the pulley 18 and roller 10 a frictional engagement, so that the parts may yield when the strain becomes too great, should this occur. In its preferred form this frictional engagement is constructed in the following manner: A pin 183 is rigidly fixed to the bottom of the chamber. The pulley 18 is made solid, with a hollow cylinder 181, which can be inverted on the pin 183 and freely turn about it. A spring 182 is applied to the cylinder 181, or rather a portion of this cylinder may be cut and bent in the form of a spring, and the roller 10 is finally inverted on the cylinder 181, so that the spring 182 presses against its interior surface, making the desired frictional connection between the said roller and the pulley 18.

The photographic impressions are received by the film during its travel past the exposure position, each point of the image striking an unexposed point of the film at the beginning of its exposure and moving with it until it passes the exposure position.

The form of apparatus shown controls the relative movements of the film and camera or lens, so that no matter what the speed of the camera the speed of the film is automatically adjusted thereto, thus insuring the accurate operation of the device.

The focus may be obtained in any suitable manner, as by adjusting the objective 6. The pictures obtained are more uniformly exposed if a diaphragm similar to that shown at 190 is placed between the objective and the film. The function of this diaphragm is very important, it being practically almost impossible to obtain uniform pictures without it. The aperture of such diaphragm may be rectangular, as shown at 191, Fig. 3, or in the form of a trapezium, as shown at 192, Fig. 4. The last form is preferred only when the view to be photographed is, for instance, a panorama where the sky is exceedingly more illuminated than the ground. The diaphragm being narrower in correspondence of the image of the sky, its exposure becomes shorter and the resulting picture is improved. The theory is that to obtain a perfectly uniform picture the image projected on the film must not be limited by sharp borders, but it must be vanishing from the central portion to the sides, and this is obtained by the employment of a diaphragm having an aperture like 19, which eliminates portions of the rays gradually from the center to the sides. This function might be helped by making the edges of the diaphragm at its aperture toothed or undulated, as shown at 193 194, Figs. 5 and 6.

Figs. 7 to 10 show a practical construction of a diaphragm embodying the two forms of Figs. 3 and 4. It consists of a hollow cylinder having two vertical openings diametrically opposite and delimited each of them by a border parallel to the axis on one side, while the border on the other side has a certain inclination relatively to the same axis. If the cylinder is in position, as shown at Fig. 7, it operates upon the rays as a diaphragm having a rectangular aperture, and in the position of Fig. 9 it operates as a diaphragm having a trapezoidal aperture. In both cases by turning a little in one or the other direction the cylinder the aperture or opening of the diaphragm is enlarged or narrowed, and consequently the duration of the exposure of the film is increased or diminished. The same practical results are obtained by the form of diaphragm shown at Fig. 11. It consists of two elastic plates fixed to the partitions 2 and 3 and subject at the top and at the bottom to the action of two couples of screws, so that by working one or the other, or both, couples of screws the opening of the diaphragm can be enlarged or narrowed or enlarged at the top and narrowed at the bottom, or vice versa.

In apparatus designed for topographic work it is advisable to fix the shaft or pin 14 about which the camera rotates in coincidence with the optical center of the objective; but this is not necessary in ordinary apparatus.

For the purpose of affording greater freedom of manipulation it is advisable to mount the pulley free on the spindle of the roller 8 and to fix it thereto when desired by a set-screw 17 or the like.

It is obvious that a perfect uniformity in the rotary movement of the camera might be provided for by clockwork or other suitable mechanism; but in practice it is found that good results are obtained by rotating the camera by hand, either directly or by means of an arm fixed to the camera, or otherwise.

The camera may be provided with an additional disposition facilitating the operation by hand when a long exposure is needed. It consists of a pulley 20, solid with pulley 11, connected by means of a belt 21 to a second pulley having about the same diameter 22, which is free to turn on a pin solid with pulley 13. By turning the pulley 22 by hand, by means of a handle 23, the camera turns slowly about its shaft 14, as it will take several complete revolutions of the pulley 22 to make a complete revolution of the camera.

As a rule for determining the relation between the several factors of movement it may be taken that for one revolution of the objective through three hundred and sixty degrees there should be a film having a length equal to the circumference of a circle that has for its radius the distance of the focused image from the optical center of the objective.

I use the word "rotate" to indicate such movement of the camera (or objective) as will effect the desired result, including any arc of the horizon.

What I claim is—

1. In a panoramic camera, a winding-on roll, a separate feed-roll, means for rotating said feed-roll, a pulley attached to said winding-on roll, and means operated by said feed-roll for rotating said pulley.

2. In a panoramic camera, a winding-on roll, and a separate feed-roll, means for rotating said feed-roll, a pulley attached to said winding-on roll, and a yielding means operated by said feed-roll for rotating said pulley.

3. In a panoramic camera, a winding-on roll, a separate feed-roll, means for rotating said feed-roll, and pulleys attached to said winding-roll and to said feed-roll, said pulleys being in operative connection with each other whereby said winding-on roll is operated from said feed-roll.

4. In a panoramic camera, a winding-on roll, a separate feed-roll, means for rotating said feed-roll, and pulleys attached to said winding-roll and to said feed-roll, said pulleys being in frictional connection with each other whereby said winding-on roll is operated from said feed-roll.

5. In a panoramic camera, a positive means for propelling a film past the exposure position at a speed which is fixedly proportional to the speed of rotation of the camera, a roll for receiving the exposed film, a pulley attached to said roll, and yielding means for driving said pulley.

6. In a panoramic camera, a cylindrical diaphragm between the exposure position of the sensitive surface and the objective, said diaphragm having openings in its cylindrical walls and the opposite sides of each opening being of different contour, said openings constituting a passage for the light to said surface, and said diaphragm adapted to be rotated to change the contour of said passage.

7. In a panoramic camera, a cylindrical diaphragm between the exposure position of the sensitive surface and the objective, said diaphragm having oppositely-arranged elongated openings in its cylindrical walls constituting a passage for the light to said surface, said openings each having a substantially vertical side and a tapered side, the tapered side of the one being next the vertical side of the other, and said diaphragm adapted to be rotated to form a passage for the light through it having substantially parallel sides or one having tapering sides.

In witness whereof I have hereunto signed my name in the presence of two subscribing witnesses.

ORESTE PASQUARELLI.

Witnesses:
MARIO CAPUNIO,
BURZIO ROMEO.